United States Patent
Frederick, Jr. et al.

[11] Patent Number: 5,139,678
[45] Date of Patent: Aug. 18, 1992

[54] PURIFICATION DEVICE

[75] Inventors: William M. Frederick, Jr., Peoria; David Kennell, Eureka; Robert Sancken, Mackinaw, all of Ill.

[73] Assignee: JH Systems, Inc., Eureka, Ill.

[21] Appl. No.: 524,131

[22] Filed: May 14, 1990

[51] Int. Cl.$^5$ .................................. B01D 6/58
[52] U.S. Cl. .................... 210/641; 210/195.2; 210/259
[58] Field of Search .............. 210/652, 259, 257.2, 210/641, 195.2, 258

[56] References Cited

U.S. PATENT DOCUMENTS

| | | | |
|---|---|---|---|
| 2,425,848 | 8/1947 | Vawter | 210/62 |
| 2,788,373 | 4/1957 | Mills et al. | 260/637 |
| 3,291,562 | 12/1966 | Anderson | 8/142 |
| 3,654,148 | 4/1972 | Bradley | 210/652 X |
| 3,931,342 | 1/1976 | Sheng | 260/637 R |
| 4,000,065 | 12/1976 | Ladha et al. | 210/652 |
| 4,072,610 | 2/1978 | Gow et al. | 210/259 X |
| 4,081,257 | 3/1978 | Lassmann et al. | 62/532 |
| 4,111,812 | 9/1978 | Baddour | 210/257 M |
| 4,160,727 | 7/1979 | Harris, Jr. | 210/257.2 X |
| 4,528,103 | 7/1985 | Spilkin et al. | 210/791 |
| 4,610,790 | 9/1986 | Reti et al. | 210/641 X |
| 4,650,586 | 3/1987 | Ellis | 210/636 |
| 4,761,295 | 8/1988 | Casey | 210/652 X |
| 4,772,402 | 9/1988 | Love | 210/804 |

*Primary Examiner*—Frank Spear
*Attorney, Agent, or Firm*—Heller & Kepler

[57] ABSTRACT

A liquid filtering and purifying device and method for filtering and purifying used engine coolant in order to produce a concentrated portion for disposal and a purified portion intended to be reused has a plurality of filtering, separating and purifying devices, both mechanical and membranous. The purification device and method of this invention provide for multiple recirculation for removing and concentrating impurities and contaminants.

20 Claims, 2 Drawing Sheets

PURIFICATION DEVICE

BACKGROUND OF THE INVENTION

The present invention relates in general to liquid filtering and purifying and pertains, more particularly, to a device including means for filtering and purifying used engine coolant in order to produce a concentrated portion for disposal and a purified portion intended for reuse. The purification device of this invention is an improvement over the conventional filters which rely on mechanical separation or require the breakdown and separation of the used coolant into constituent parts prior to recovery.

With the conventional filter device it is generally necessary to first separate an emulsion before further separation. For example, recovering surfactant from an oil, water and surfactant emulsion may require pretreatment of the emulsion with chemicals followed by reverse osmosis. Other conventional devices use mechanical and chemical purifying processes. Coarse and fine filters have been used to remove foreign matter and activated charcoal filters have been used to remove bacteria.

Other conventional approaches include chemical reactions resulting in a precipitate or a phase change used to remove water, for example, by freezing. Backwashing, flushing and multiple mechanical filters are additional conventional approaches.

Conventional filters and purifiers actually may not concentrate an impurity, thereby often leaving a large volume of the impurity to be disposed of in a land fill or through an oxidation process, such as by incineration. Most disposal techniques have similar drawbacks, including limited number and volume of dump sites or land fills available for disposal and the expense of disposal which is typically directed proportional to the volume of material to be disposed.

Accordingly, it is an object of the present invention to provide an improved purification device and method that is adapted to remove impurities from a coolant mixture of ethylene glycol and water. With the purification device and method of this invention it has been found that the impurities are removed from the used coolant and concentrated to reduce the volume and thus the cost of disposal.

Another object of the present invention is to provide an improved purification device and method to reduce dissolved solids and in particular chlorides and sulfates.

A further object of the present invention is to provide an improved purification device and method to purify used engine coolant in order that the purified coolant may be reused. It is expected that the used coolant will be approximately 90% reclaimed with the impurities trapped and collected in either at least one disposable filter or concentrated in the approximately 10% retained after purification.

Still another object of the present invention is to provide an improved purification device and method that reduces waste disposal volume and the cost of engine coolant. The device and method of this invention is characterized by maintaining substantially the same water to ethylene ratio in a purified engine coolant as in unused engine coolant.

Still a further object of the present invention is to provide an improved purification device and method for reducing chlorides, sulfates and conductivity of used engine coolant. A concentrated waste by-product is removed leaving a clarified engine coolant intended for reuse as an engine coolant.

Another object of the present invention is to provide an improved purification device utilizing an improved purification method that is adapted for portable use. The portability of the device should allow small and large users alike to take advantage of this invention.

A further object of the present invention is to provide an improved purification device and method that includes reusable purification components and elements. The present invention may be operated for extended periods without replacing components, thereby reducing potential down time of the device.

SUMMARY OF THE INVENTION

To accomplish the foregoing and other objects of this invention there is provided a purification device for purifying a fluid such as a used engine coolant and concentrating the impurities and contaminants removed from the fluid for subsequent disposal. The purification device comprises purifying means including mechanical and membranous purification and separation devices. At least one retaining means is provided for separating and concentrating the impurities and contaminants removed from the fluid.

Multiple state purification and separation is provided for in part by series purification and in part by recirculation of portions of the fluid for further purification and concentration of the impurities and contaminants.

In one embodiment reverse osmosis separates a feed stream fluid into an output including a permeate and a concentrate fluid output. The fluid is batch fed from a concentrate tank to the reverse osmosis device. The batch feed recirculates concentrate from the reverse osmosis device.

A preferred embodiment includes multiple stage filtration and purification including a mesh screen, a first particulate filter for micron size particulate, a second particulate filter for micron size particulate and a reverse osmosis device. The particulate filters preferably comprise a microporous membrane that separates suspended solids from an output, such as provided by an ultrafilter.

A method for purifying a fluid and concentrating impurities and contaminants removed by the purifying method comprises the steps of retaining a quantity of a contaminated fluid feed stream and transferring a portion of the contaminated fluid stream to first purifying means then second purifying means and then third purifying means. Recirculating of the unpurified fluid feed stream is accomplished for the second and the third purifying means. The fluid is successively concentrated by the removal of impurities and contaminants into a succession of concentrates.

A preferred embodiment is described in which the first purifying means includes mechanical filters, the second purifying means includes ultrafilter equipment, and the third purifying means includes reverse osmosis equipment. The purpose and function of these elements of the device of the present invention is set forth in the following detailed description of one preferred embodiment.

The preferred embodiment provides a device and method for purifying used engine coolant and concentrating the impurities and contaminants removed from the used coolant. The purified fluid should be suitable for reuse as engine coolant with little more added than a conventional additive package and a coloring agent as is common in the industry. The additive package may include a corrosion inhibitor or other suitable pH buffer.

These and other objects and features of the present invention will be better understood and appreciated from the following detailed description of one embodiment thereof, selected for purposes of illustration and shown in the accompanying drawings.

DETAILED DESCRIPTION

Figure 1:
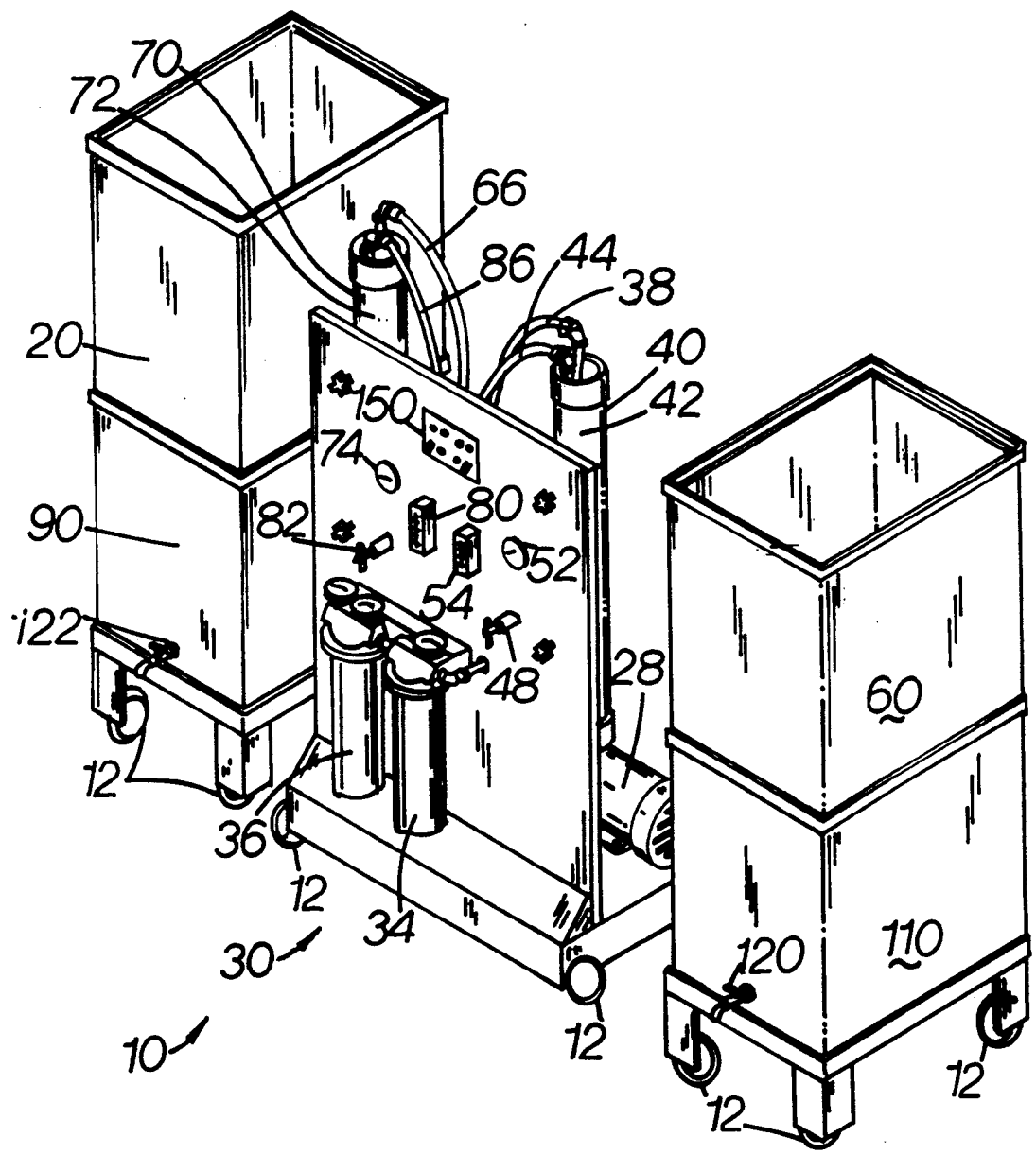
FIG. 1 is a perspective view of a purifying device constructed in accordance with the present invention.
Figure 2:
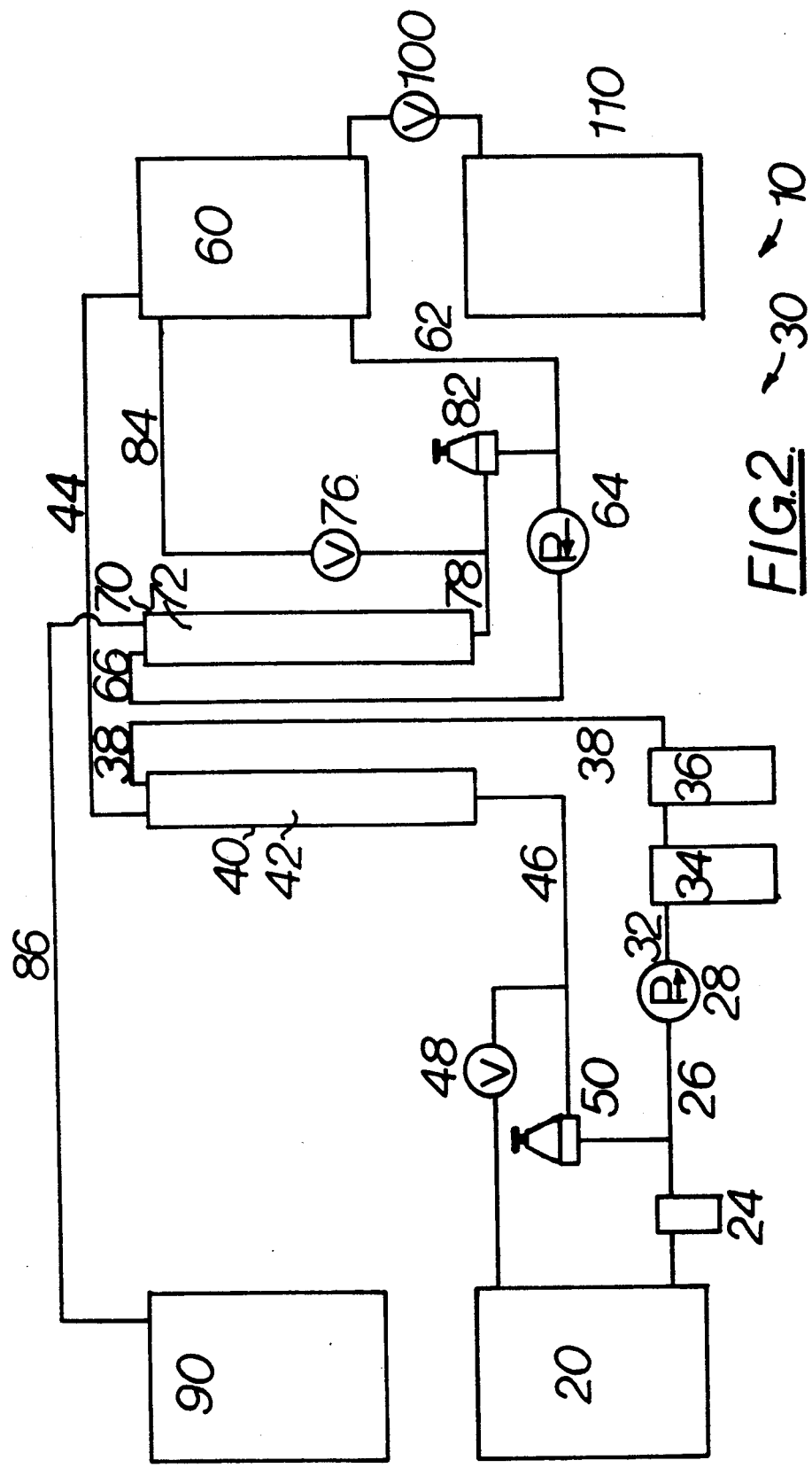
FIG. 2 is schematic illustration of the device of the present invention.

Referring now to the drawings there is shown a preferred embodiment for the purification device and method of purifying a used coolant by this invention. The purifying device and the purifying method is described in connection with the purification of engine coolant and particularly an ethylene glycol and water mixture. The purifying device and the method of purifying of the present invention are particularly adapted for providing reusable engine coolant and concentrating the removed impurities and contaminants.

The drawings show an anti-freeze reclamation and purification device 10 constructed in accordance with this invention. A tank 20 retains used engine coolant such as a conventional liquid anti-freeze. The tank 20 connects to a first of a plurality of filtration and purification devices, which is a mechanical filter 24. A preferred embodiment illustrated in FIG. 1 is equipped with a 100 mesh screen filter.

It will be understood that some but not all piping, tubing, valves and the like are shown and described herein for purposes of clarity. Furthermore, conventional pumps, valves, flow meters, filtration and reverse osmosis devices are well known, and are typically available commercially. Thus, it will not be necessary to further illustrate or describe in detail these and other conventional components and elements of the present invention.

Intermediate piping or tubing connects the output or discharge side of filter 24 to an intake of a pump 28. This and other pumps will be suitable for pumping liquids, such as engine coolant, containing contaminants and impurities. The pump 28 pressurizes the coolant from the mesh screen filter 24 for transfer to the next state of the purification system generally identified as reference character 30 in FIG. 1.

The next stage includes mechanical filtration of the used coolant to remove impurities and contaminants in series with subsequent purification, which in a preferred embodiment comprises membranous filtration to remove impurities and contaminants on a molecular level. The filtered and further purified coolant is recirculated from the membranous filter back to the pre-filtration mechanical filtration means and pump 28 should be sized accordingly.

The mechanical filtration is accomplished in the disclosed embodiment with a five (5) micron filter 34 in series with a one (1) micron filter 36. Thus, the desired initial filtration or pre-filtration is accomplished by this invention. Membranous filtration is accomplished with an ultrafiltration device. Connecting pipe or tubing 38 interconnects the membranous filter input with the output of the pre-filtration means.

An ultrafilter, including membrane housing 40 and membrane 42 provides a microporous membrane that separates suspended solids from a feed stream based upon a distribution of particle sizes.

The size of the micropores in any given ultrafilter device is conventionally given in a particular, known range. In the disclosed embodiment the pump 28 provides a relatively constant pressure of approximately fifty (50) p.s.i. at an input to the membranous filtration device. The used engine coolant provides the feed stream with its impurities and contaminants including the suspended solids and particulate.

It will be within the understanding of one skilled in the art to choose a suitable ultrafilter once the present invention is understood and a particular application of this invention is identified.

Connecting pipe or tubing 44 provides for transfer of the pre-filtered and filtered feed stream to a retaining and holding means for the next steps of the method of the present invention which are to be accomplished in batches. Additional connecting piping or tubing 46 provides for recirculation of the concentrate back to pre-filtration. In the preferred embodiment illustrated, this accomplishes the first concentration step for contaminants and impurities from the feed stream.

Recirculation at this point in the process is controlled in part by valve means for directing the concentrate either back to the pre-filtration means or to the initial retaining means (tank 20) where it is mixed with as of yet unprocessed, used engine coolant. Recirculation is controlled by the combination of valve means and pressure regulator means located in parallel in piping or tubing 46. A recycle valve 48 provides communication between ultrafilter concentrate and tank 20.

System pressure at this stage is maintained by a pressure regulator 50 providing communication for pressurized concentrate in pipe or tubing 46 for diversion to the pre-filtration stage. In the disclosed embodiment it is preferred to recirculate the concentrate to a point intermediate the mesh filter 24 and the intake or low pressure side of the pump 28.

Changing the set point of the flow valve 48 will vary the flow of concentrate, the amount of concentrate returned to the tank and the amount of concentrate returned to pre-filtration. In a preferred embodiment the flow valve is set to return from approximately 75% to approximately 90% of the concentrate to the pre-filtration pump intake.

A preferred embodiment illustrated in FIG. 1 includes a pressure gauge 52 and a flow meter 54 for indicating system conditions associated with the pre-filtration and membranous filtration steps and devices of this invention.

The coolant discharged on the low pressure side of membranous filter 42 is transferred to another retaining means for providing storage for the next purification steps and associated devices. Connecting piping or tubing 44 is located intermediate the membranous or ultrafilter of the disclosed embodiment and retaining tank 60. Tank 60, as previously discussed, is a batch tank and output piping or tubing 62 connects the tank 60 with another pump 64.

A discharge or high pressure side of the pump 64 feeds another membranous purifying device through connecting piping or tubing 66. In a preferred embodiment the membranous device includes a reverse osmosis device with its membrane housing 70 for a proprietary thin film membrane 72, such as manufactured by Desalination Systems, Inc. of Escondito, Calif. Another preferred embodiment may include an asymmetric reverse osmosis membrane. It is not necessary to show the membrane for a complete understanding of the present invention.

It is desirable to know the system conditions associated with this membranous purifying device. Therefore, FIG. 1 illustrates a pressure gauge 74 and a flow meter 80 as typical measurement instruments in a preferred embodiment.

Recirculation takes place at this stage of the purification process. A recycle valve 76 and another pressure regulator 82 are provided to accomplish this aspect of the present invention. A concentrate is removed from the reverse osmosis device through connecting piping or tubing 78.

Connecting piping or tubing 78 and 84 provides for recirculation of the reverse osmosis concentrate containing impurities and contaminants back to either the batch tank 60 or filter pump 64 on the low pressure or intake side of the pump. The pressure regulator maintains the system pressure during operation of this invention.

In the preferred embodiment illustrated, the recirculation accomplishes the next concentration step for concentrating contaminants and impurities. Recirculation and concentration at this point in the process is controlled in part by valve means for directing the concentrate back either to the membranous filter, the purifier means or the batch tank and retaining means 60 where concentrate is mixed with previously processed used engine coolant.

Recirculation is controlled by the combination of valve means and pressure regulator means located in parallel piping or tubing combination 78, 84, and 66. The recycle valve 76 provides the function of flow regulation between reverse osmosis purifier and filter concentrate and tank 60. In the disclosed embodiment it is preferred to recirculate the concentrate to a point intermediate the tank 60 and the intake or low pressure side of the pump 64.

Changing the set point of the flow valve 76 will vary the recirculation flow of concentrate and the amount of concentrate returned to the tank 60. In a preferred embodiment the flow valve is set to return from approximately 75% to approximately 90% of the concentrate to the intake of pump 64.

It will be understood that conventional reverse osmosis devices use a semipermeable membrane to separate a solvent from dissolved solids in the solvent. The membrane is selected having greater permeability for the solvent than the dissolved solids. Solvent feed pressure to the membrane must be greater than the osmotic pressure of the solvent.

The solvent on the downstream or low pressure side of the membrane is typically referred to as the permeate, and solvent containing impurities and contaminants remaining on the high pressure side of the membrane is typically identified as the "concentrate". The solvent in the present invention is the used engine coolant fed to the reverse osmosis membrane by pump 64. In the disclosed embodiment the pump 64 provides a relatively constant pressure of approximately six hundred (600) p.s.i. at an input to the reverse osmosis membrane.

Connecting piping or tubing 86 intermediate the reverse osmosis membrane and housing 70, 72 and a tank 90 provide for transfer of the fully processed used engine coolant to a retaining means or tank for collection and storage.

A waste or concentrate control valve 100 controls removal of the concentrated impurities and contaminants from tank 60. The concentrate is collected and retained in a waste tank 110. Tanks 110 and 60 are separate as are tanks 20 and 90.

The concentrated impurities and contaminants have been dramatically reduced in volume. The test results set forth in TABLES I, II, and III indicate that the volume of waste material is approximately one (1) gallon of waste for every fifteen (15) gallons of used antifreeze.

TABLE I

<<<WATER ANALYSIS>>>

|  | PPM |
|---|---|
| CATIONS: | |
| Sodium (Na) | 1900. |
| Potassium (K) | 630. |
| ANIONS: | |
| Boron (B) | 460. |
| Phosphorus (P) - Filterable | 340. |
| Sulfur (S) - Filterable | 93. |
| Silica (SiO2) - Filterable | 65. |
| Nitrate (NO3) | 580. |
| Sulfate (SO4) | 170. |
| Nitrite (NO2) | 29. |
| Chloride (Cl) | 27. |
| OTHERS: | |
| Conductivity - 10% Dilution (mmhos/cm) | 827. |
| Freeze Protection (Degrees F.) | −15 |
| Antifreeze - by Refractometer (%) | 42 |

Elements (XX2) not detected (L.D. = 5 ppm):

| BA2 | CA2 | CD2 | CO2 | CR2 | CU2 | FE2 | MG2 | MN2 | MO2 | NI2 |
| PB2 | SB2 | SN2 | SR2 | TI2 | TL2 | V2 | ZN2 | ZR2 | AL2 | |

TABLE II

FIRST STAGE
<<<WATER ANALYSIS>>>

| | PPM |
|---|---|
| CATIONS: | |
| Sodium (Na) | 2000. |
| Potassium (K) | 710. |
| Molybdenum (Mo) - Filterable | 8. |
| ANIONS: | |
| Boron (B) | 490. |
| Phosphorus (P) - Filterable | 380. |
| Sulfur (S) - Filterable | 96. |
| Silica (SiO2) - Filterable | 67. |
| Nitrate (NO3) | 650. |
| Sulfate (SO4) | 180. |
| Nitrite (NO2) | 22. |
| Chloride (Cl) | 20. |
| OTHERS: | |
| Conductivity - 10% Dilution (mmhos/cm) | 815. |
| Freeze Protection (Degrees F.) | −25 |
| Antifreeze - by Refractometer (%) | 47 |
| Elements (XX2) not detected (L.D. = 5 ppm): | |
| BA2 CA2 CD2 CO2 CR2 CU2 FE2 MG2 MN2 NI2 PB2 SB2 SN2 SR2 TI2 TL2 V2 ZN2 ZR2 AL2 | |

TABLE III

<<<WATER ANALYSIS>>>

| | PPM |
|---|---|
| CATIONS: | |
| Sodium (Na) | 320. |
| Potassium (K) | 160. |
| ANIONS: | |
| Boron (B) | 84. |
| Phosphorus (P) - Filterable | 6. |
| Sulfur (S) - Filterable | 6. |
| Silica (SiO2) - Filterable | 36. |
| Nitrate (NO3) | 660. |
| Chloride (Cl) | 12. |
| Nitrite (NO2) | 6.3 |
| Sulfate (SO4) | <0.5 |
| OTHERS: | |
| Conductivity - 10% Dilution (mmhos/cm) | 167. |
| Freeze Protection (Degrees F.) | −20 |
| Antifreeze - by Refractometer (%) | 44 |
| Elements (XX2) not detected (L.D. = 5 ppm): | |
| BA2 CA2 CD2 CO2 CR2 CU2 FE2 MG2 MN2 MO2 NI2 PB2 SB2 SN2 SR2 TI2 TL2 V2 ZN2 ZR2 AL2 | |

Various valves are illustrated, such as drain valve 120 for draining concentrated waste and drain valve 122 for the purified engine coolant tank 90. The instruments previously referred to are located on a control panel 150, as are the other system status indicators and meters. It will be understood that the control panel arrangement may vary as required for various applications of this invention.

In operation, in connection with the purification of a used engine coolant, that is an anti-freeze, and the apparatus for reclaiming the used anti-freeze 10 previously mentioned to purify the used coolant, a quantity of used engine coolant is retained in the tank 20. A portion of the used coolant is then transferred to a first purifying means, including a 100 mesh screen filter 24, a five (5) micron filter 34, and a one (1) micron filter 36.

The test results shown in TABLES I, II, and III reflect tests run with a tank retaining approximately fourteen (14) gallons of used engine coolant.

Transferring the used engine coolant to a first purifying means or pre-filter for initial filtering and purifying prepares the used coolant for subsequent filtering and purifying by removing the larger particulate contaminants and impurities. The second purifying means then receives the coolant for further processing.

The purified output from the second purifying means is transferred to a retaining means, for example, tank 60. The portion of used coolant that is not purified, that is the concentrate, is recirculated for additional filtering and purification. A flow control valve provides control of the recirculation volume flow rate to tank 20.

The filtrate is collected for batch processing by the next purification means. The purified output or feed stream to this latter purification means provides an engine coolant that can be purified to the point of removing the color added to the ethylene and glycol mixture. The purified output, or Final Product #1, is ready for reuse. The process of this invention has reduced the conductivity and dissolved solids of the Original Coolant as indicated in the test results tabulated in TABLES I, II, and III.

The filtrate is recirculated to either the concentrate tank or back to this purification means. The combination of this purification step and the subsequent concentration of the concentrate provides for a reduction from fourteen (14) gallons of used engine coolant to one (1)

gallon of a disposable waste. The sample tested and reported in TABLE III was removed from the present invention at the point generally indicated by reference character 122.

In the disclosed embodiment the pre-filtration step provides mechanical purification or filtration. The next purification step of the process of this invention includes providing membranous separation means for purifying the fluid. In a preferred embodiment this includes providing a microporous membrane that separates suspended solids from a feed stream. The disclosed embodiment accomplishes this with ultrafiltration.

The following step of the disclosed purification process includes providing another membranous separation means for further purifying the engine coolant. In a preferred embodiment this includes providing a membrane for separating dissolved solids from a feed stream based upon a relative transport rate through the membrane or skin as a function of solubility of the suspended solids and the feed stream in the film, with respect at least to salts if not organics, which are rejected by molecular weight, geometry of the solute and other related parameters. The disclosed embodiment accomplishes this by reverse osmosis.

The microporous membrane of the ultrafilter separates suspended solids from a feed stream. The reverse osmosis membrane is positioned in series with the ultrafilter for subsequent reverse osmosis purification and separation of the feed stream.

The reverse osmosis membrane separates the ultrafilter output or permeate from a concentrate based upon a relative transport rate through the membrane or skin as a function of solubility of the solute and solvent in the film.

The separated concentrate of the second purifying means, the ultrafilter in the disclosed embodiment, is recirculated back to the microporous membrane for further separation. Similarly, a portion of the concentrate of the third purifying means, the reverse osmosis membrane in the disclosed embodiment, is recirculated back to the reverse osmosis membrane for additional separation and concentration.

It is believed that pre-filtering and ultrafiltering the solvent as disclosed in the present invention reduces and may substantially eliminate the plugging and fouling problems experienced by conventional reverse osmosis membrane.

The reverse osmosis process and the ultrafiltration process may be compared by considering the size differential of the molecules between the intended feed stream and the intended permeate and concentrate. Conventional ultrafiltration is not indicated when the size of the molecules of intended permeate and the size of the molecules of the intended concentrate do not differ significantly.

Initial laboratory results using used engine coolant are set forth in the accompanying tables. Table I reports the analysis for a used coolant prior to purification. Table II reports the analysis for the used engine coolant after second stage purification. Table III reports the analysis for the final product which began as the used engine coolant.

From the foregoing description those skilled in the art will appreciate that all objects of the present invention are realized. The present invention removes impurities from a coolant mixture of ethylene glycol and water. The purification device and method of this invention remove impurities and contaminants from the used coolant. These impurities and contaminants are removed, at least partially segregated, and concentrated to reduce the volume and thus the cost of disposal.

The present invention provides an improved purification device and method that reduces dissolved solids and in particular chlorides and sulfates as indicated by a comparison of TABLES I, II, and III. When the device and method of the present invention are applied to a used engine coolant the resulting fluid may be reused.

It is further expected that the used coolant will be approximately 90% reclaimed with the impurities trapped and collected in either at least one disposable filter or concentrated in the approximately 10% remaining after purification.

The test results indicate that, according to the refractometer results, the purified engine coolant maintains substantially the same water to ethylene glycol ratio in the purified engine coolant as in new engine coolant.

It will be further understood that the present invention is readily adapted for portable use. The portability, use of relatively conventional components and the potential for extended use of the device should allow small and large users alike to take advantages of the savings of this invention. Portability is accomplished by the addition of means for moving the equipment, for example, either on wheels 12, a common skid on wheels, or the like.

The preferred embodiment combines the disclosed purification and filtration devices in a manner not known heretofore and results in a purified fluid that can be reused and the waste to be removed reduced in volume for disposal. The test results further indicate that the contaminants and impurities that often present a waste disposal problem have been separated by the present invention. Thus, this waste which is typically expensive to dispose, is concentrated for appropriate and relatively inexpensive disposal.

It will be understood that suitable power connections are within the knowledge of one skilled in the art to supply, attach, or obtain.

Many of the components of the present invention can be cleaned by known methods in order to extend the useful component life. Cleaning and reusing the components should reduce the overall cost of operation, downtime of the equipment, and need for a substantial inventory to ensure continued operation, to identify but a few of the resulting advantages.

While specific embodiments have been shown and described, many variations are possible. The particular arrangement of the components, sizes, pressure ratings, instruments and instrument panel may be changed to suit the equipment and the type or amount of fluid with which it is to be used. The tank configuration, location, and arrangement may also vary to suit a desired application.

It is not intended to limit the present invention to the particular ranges described. Different feed streams may have different levels of contaminants and impurities which may require either the same recirculation rates or variations to meet these specific applications. It is contemplated that the present invention will have application to other as of yet unidentified or unknown feed streams. It is readily apparent that the application of the device and method of this invention to these feed streams could require particular recirculation rates.

Having described the invention in detail, those skilled in the art will appreciate that modifications may be made of the invention without departing from its spirit.

Therefore, it is not intendedf that the scope of the invention be limited to the specific embodiment illustrated and described. Rather, it is intended that the scope of this invention be determined by the appended claims and their equivalents.

What is claimed is:

1. A purification device for purifying a fluid and concentrating impurities and contaminants removed from the fluid, comprising:
   means for purifying a fluid containing impurities and contaminants, purifying means including mechanical purifying means and membranous purifying means;
   the mechanical purifying means and membranous purifying means operatively associated with at least one retaining means for separating and concentrating contaminants;
   one membranous purifying means including a microporous membrane, another membranous purifying means including a reverse osmosis membrane, a retaining means intermediate the one membranous purifying means and the other membranous purifying means;
   the mechanical purifying means and membranous purifying means in operative communication with one retaining means;
   another retaining means in operative communication with the membranous purifying means to concentrate impurities and to return a portion of its volume to the membranous purifying means;
   a waste retaining means in operative communication with the other retaining means; and
   the other membranous purifying means in operative communication with a processed fluid retaining means.

2. A purification device for purifying a fluid and concentrating impurities and contaminants removed from the fluid as set forth in claim 1 wherein purifying means include:
   means for providing first stage purification;
   means for providing second stage purification in operative communication with the fluid output from first stage purification means; and
   means for providing reverse osmosis separation, reverse osmosis separation means in operative communication with an outlet operatively associated with second stage purification means fluid output retaining means, reverse osmosis separating means providing permeate fluid output and a concentrate fluid output.

3. A purification device for purifying a fluid and concentrating impurities and contaminants removed from the fluid as set forth in claim 2 wherein:
   second stage purification means output is collected in retaining means for batch feeding of the reverse osmosis separating means.

4. A purification device for purifying a fluid and concentrating impurities and comtaminants removed from the fluid as set forth in claim 3 wherein:
   a batch feed retaining means provides a first concentrate of contaminants and impurities from second stage purification means; and
   another batch feed retaining means provides a second concentrate of contaminants and impurities from reverse osmosis separation means.

5. A purification device for purifying a fluid and concentrating impurities and contaminants removedl from the fluid as set forth in claim 1 wherein:
   second stage purification means output is retained in retaining means;
   reverse concentrate is retained in the retaining means; and
   means for recirculating reverse osmosis concentrate and second stage purification outputs, providing thereby a recirculated fluid portion containing impurities and contaminants removed from the fluid for further purification.

6. A purification device for purifying a fluid and concentrating impurities and contaminants removed from the fluid as set forth in claim 1 wherein purification means include:
   a mesh screen;
   a first particulate filter for micron size particulate, the first particular filter located downstream from the mesh screen; and
   a second particulate filter for micron size particulate, the second particulate filter located downstream of the first particular filter and the second particulate filter sized for removal of additional particulate generally smaller than that intended to be removed by the first particulate filter.

7. A purification device for purifying a fluid and concentrating impurities and contaminants removed from the fluid as set forth in clim 1 wherein purification means include:
   a microporous membrane that separates a portion of suspended solids from a feed stream based upon a distribution of particle sizes in a known size range; and
   a reverse osmosis membrane for separating solutes or dissolved solids as is suitable from the respective feed stream based upon a relative transport rate through the membrane or skin as a function of solubility of the dissolved solids and solvent in the film.

8. A purification device for purifying a fluid, comprising:
   meams for retaining a quantity of a contaminated fluid feed stream to be purified;
   means for providing first stage purification in operative communication with an outlet operatively associated with contaminated fluid retaining means;
   means for providing second stage purification in operative communication with the fluid output from first stage purification means;
   means for retaining the fluid output from second stage purification means, fluid output retaining means in operative communication with the fluid output from second stage purification means;
   means for providing reverse osmosis separation, reverse osmosis separation means in operative communication with an outlet operatively associated with second stage purification means fluid output retaining means, reverse osmosis separating means providing a subsequent permeate as a relatively purified fluid output and a subsequent concentrate fluid output; and
   means for retaining reverse osmosis concentrate, reverse osmosis concentrate fluid retaining means in operative communication with concentrate fluid output.

9. A purification device as set forth in claim 8 wherein retaining means includes a tank for receiving and holding the contaminated fluid to be purified.

10. A purification device as set forth in claim 8 wherein first stage purification means includes at least one filtration device.

11. A purification device as set forth in claim 8 wherein first stage purification means includes a plurality of filtration devices.

12. a purification device as set forth in claim 11 wherein the filtration devices comprise:
   a mesh screen;
   a first particulate filter for micron size particulate, the first particulate filter located downstream from the mesh screen; and
   a second particulate filter for micron size particulate, the second particulate filter located downstream of the first particulate filter and the second particulate filter sized for removal of additional particulate generally smaller than that intended to be removed by the first particulate filter.

13. A purification device as set forth in claim 12 wherein:
   a membrane separates dissolved solids from a solvent based upon a relative transport rate through the membrane or skin as a function of solubility in the film of the dissolved solids and solvent.

14. A purification device as set forth in claim 13 wherein:
   a concentrate is recirculated back to the microporous membrane for further separation; and
   a subsequent portion of the feed stream is recirculated back to the reverse osmosis membrane for further separation and concentration.

15. A method for purifying a fluid and concentrating impurities and contaminants removed by the purifying method, comprising the steps of:
   retaining a quantity of a contaminated fluid feed stream of be purified;
   transferring a portion of the contaminated fluid feed stream to first purifying means;
   purifying the fluid feed stream portion with first purifying means;
   transferring the purified fluid portion from first purifying means to second purifying means;
   purifying the transferred feed stream portion with second purifying means;
   transferring the purified portion from second purifying means to the second retaining means;
   recirculating the concentrate back to second purifying means;
   transferring the fluid from second retaining means to third purifying means;
   purifying the feed stream with third purifying means;
   concentrating the impurities and contaminants removed by third purifying means in the second retaining means;
   transferring the purified portion to purified retaining means; and
   recirculating a portion back to third purifying means from the concentrate retaining means.

16. A method for purifying a fluid and concentrating impurities and contaminants removed by the purifying method as set forth in claim 15, wherein the steps include:
   providing mechanical purifying means for purifying the feed stream portion.

17. A method for purifying a fluid and concentrating impurities and contaminants removed by the purifying method as set forth in claim 15, wherein the steps include:
   providing membranous separation means for purifying the feed stream portion.

18. A method for purifying a fluid and concentrating impurities and contaminants removed by the purifying method as set forth in claim 17, wherein the steps include:
   providing a microporous membrane that separates suspended solids from a feed stream based upon a distribution of particle sizes in a known range.

19. A method for purifying a fluid and concentrating impurities and contaminants removed by the purifying method as set forth in claim 17, wherein the steps include:
   providing a membrane for separating dissolved solids from a solvent based upon a relative transport rate through the membrane as a function of solubility in the film of the suspended solids and feed stream.

20. A method for purifying a fluid and concentrating impurities and contaminants removed by the purifying method as set forth in claim 15, wherein the steps include:
   providing a microporous membrane that separates suspended solids from a feed stream based upon a distribution of particle sizes in a known range in series with a membrane for providing separation based upon a relative transport rate through the membrane as a function of solubility;
   recirculating a concentrate back to the microporous membrane for further separation; and
   recirculating another concentrate back to the membrane for further separation.

* * * * *